US006259821B1

(12) United States Patent
Branciforte et al.

(10) Patent No.: US 6,259,821 B1
(45) Date of Patent: Jul. 10, 2001

(54) PDL OPERATOR OVERLOADING FOR LINE WIDTH MANAGEMENT OF LINES THAT INTERSECT FILLED OBJECTS

(75) Inventors: Michael Branciforte, Rochester; Ann Marie Cecchi; Robert Paul Loce, both of Webster, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/179,419

(22) Filed: Oct. 27, 1998

(51) Int. Cl.[7] .................................................. G06F 17/50
(52) U.S. Cl. ............................................ 382/258; 382/259
(58) Field of Search .................................. 382/258–259, 382/254, 256; 358/1.9; 345/112–113, 418, 435

(56) References Cited

U.S. PATENT DOCUMENTS

| 4,279,003 | * | 7/1981 | Schulz | 358/280 |
|---|---|---|---|---|
| 4,484,347 | * | 11/1984 | Kashioka | 382/47 |
| 4,791,679 | | 12/1988 | Barski et al. | 382/55 |
| 5,128,698 | | 7/1992 | Crawford et al. | 346/160 |
| 5,483,258 | * | 1/1996 | Cornett et al. | 345/118 |
| 5,483,351 | | 1/1996 | Mailloux et al. | 395/109 |
| 5,579,446 | | 11/1996 | Naik et al. | 395/109 |
| 5,704,021 | | 12/1997 | Smith et al. | 395/109 |
| 5,731,823 | | 3/1998 | Miller et al. | 347/5 |
| 5,923,573 | * | 7/1999 | Hatanaka | 365/578 |
| 6,031,544 | * | 2/2000 | Yhann | 345/434 |
| 6,179,485 | * | 2/2000 | Harrington | 395/109 |

OTHER PUBLICATIONS

"Enhancement and Restoration of Digital Documents—Statistical Design of Nonlinear Algorithms", Robert P. Loce et al., SPIE Optical Engineering Press, pp. 42–50, 1997.
"Improved Print Quality by Recording Power Modulation", Jack L. Crawford et al., May 25, 1988.

* cited by examiner

Primary Examiner—Thomas D Lee
Assistant Examiner—Stephen Brinich
(74) Attorney, Agent, or Firm—Oliff & Berridge, P.L.C.

(57) ABSTRACT

A method and apparatus for overloading operators in Page Description Language (PDL) defined graphics redefines the graphic, such as to compensate for certain undesirable line growth characteristics of a target printer or display device. Line width can be controlled based on various attributes, such as color, size, or width. Additionally, the method and apparatus determine whether a line of an object of the graphic intersects with or completely overlays another object. If it does, only those overlying portions are redefined. A line of the graphic can be redefined to be wider, narrower or of a differing color to achieve a desired printed graphic. Also, the method and apparatus can compensate for fill in of reverse-line and "cookie-cutter" holes. The method, performed within a decomposer, examines individual lines of a PDL defined graphic, determines if compensation is needed to achieve a desired printed output, and redefines an operator to achieve the compensation. The method also determines whether the line intersects with or completely overlays another object of the graphic.

20 Claims, 9 Drawing Sheets

```
globaldict begin
true setglobal
    /iBx 0 def
    /usets 10 array def
false setglobal
end /addusets {usets up length 1 sub get null ne {usets length/tmp exch array def usets tmp copy globaldict /usets undef
length 10 add globaldict begin true setglobal /usets exch array def false setglobal end usets 0 tmp putinterval}if}bind def /execuobj {usets exch get} bind def %%overload graphics fill operators /fill {addusets globaldict begin /iBx iBx 1 add def true setglobal false upath cvlit false setglobal usets iBx 3 2 roll put fill end}
bind def /ufill {addusets globaldict begin /iBi iBx 1 add def true setglobal false upath cvlit false setglobal usets iBx 3 2 roll put ufill
end} bind def /eofill {addusets globaldict begin /iBx iBx 1 add def true setglobal false upath cvlit false setglobal usets iBx 3 2 roll put eofill
end} bind def %%overload the stroke operator to check the lines <= 3 device pixels /stroke {currentlinewidth 0.36 le
%TRUE(1 - make a userpath of the thin line )
    {false upath cvlit dup length /currentup exch array def currentup copy pop
```

```
1 1 iBx
{/cv exch def
    %%check for intersection with another object in the image
        cv execuobj currentup inustroke
%TRUE{2 - check to see if the line overlays the object or intersects it)
{cv execuobj 0 get
currentup 0 get gt
cv execuobj 2 get
currentup 2 get it and
cvexecuobj 1 get
currentup 1 get gt and
execuobj 3 get
currentup 3 get it and %TRUE{3 - the line overlays the object}

{   gsave currentlinewidth 0.12 le
    %TRUE{7 - the line is less than or equal to one device pixel )
        {currentline width .18 add
        } % end TRUE{7)
    %FALSE{7)
    {currentlinewidth 0.25 le
        %TRUE{8 - the line is less than or equal to two device pixels)
            {currentlinewidth 0.12 add
            }%end TRUE{8)
        %FALSE{8)
        {currentlinewidth 0.36 le
            %TRUE{9- the line is less than or equal to three device pixels)
```

```
                {currentline width 0.06 add
                } % end TRUE(9)
                %FALSE(9)
                {currentlinewidth
                } ifelse % end FALSE (9)
            }ifelse % end FALSE(8)
        }ifelse % end FALSE(7)
    setlinewidth stroke grestore
    } % end TRUE(3)

%FALSE(3 the line intersects the object)
    }   gsave
        newpath
        cv execuobj cvx exec clip
        newpath
        currentlinewidth 0.12 le
            %TRUE(4-the line is less than or equal to 1 device pixel)
            {currentlinewidth .18 add}% end TRUE(4)
            %FALSE(4)
            {currentlinewidth 0.25 le
                    %TRUE(5- the line is less than or equal to 2 device pixels)
                    {currentlinewidth .12 add}
                    %FALSE(5)
                    {currentlinewidth 0.36 le
                            %TRUE(6- the line is less than or equal to 3 device pixels)
                            {currentlinewidth 0.06 add}
                            %FALSE(6)
                            {currentlinewidth} ifelse% end FALSE(6)

}ifelse % end FALSE(5)

}ifelse  % end FALSE(4)
        setlinewidth stroke
        currentup cvx exec stroke
        grestore
        currentup cvx exec stroke
        }ifelse % end FALSE(3)

}% end TRUE(2)

%FALSE(2- the line does not intersect or overlay any object )
}stroke
```

FIG. 11

```
        }ifelse   %end FALSE(2)

}for
}%TRUE(1)

%FALSE(1 - the line is greater than 3 device pixels)
  {stroke
  }ifelse  % end FALSE(1)

}bind def  % end procedure
```

FIG. 12

PDL OPERATOR OVERLOADING FOR LINE WIDTH MANAGEMENT OF LINES THAT INTERSECT FILLED OBJECTS

BACKGROUND OF THE INVENTION

1. Field of Invention

The invention relates to a method and apparatus for overloading operators in Page-Description-Language (PDL) defined images to adjust widths of lines or other image attributes in a manner that yields preferred line widths and appearance or compensates for marking characteristics of a target printer or display device. More specifically, line width can be controlled based on whether a line is being drawn over a colored filled object or on a blank background.

2. Description of Related Art

In a network or single personal computer environment, a user may create a job representing a page to be printed having one or more sections of text, graphics and photos. Alternatively, a job may be scanned in or copied from an existing file. This job is encoded into a page description language, such as Postscript®, a trademark of Adobe Systems Inc., and sent to a printer driver for printing by a printer or other marking system or displayed on a display system, such as a monitor. Other page description languages exist, or may be developed in the coming years, and the inventive overloaded method to apply "line drawing" operators can be used in any relevant computer language or control code.

Postscript® is a programming language optimized for printing graphics or text. It provides a convenient language in which to describe images in a device independent manner. That is, the same code is used regardless of the printer or output device. Postscript® is a stack-based interpreted language. In Postscript®, you push operands onto an operand stack by naming them and then you invoke the operator to use them.

A "def" operator enters a definition into a top-most dictionary on a dictionary stack. The top operand on the operand stack is the value, and the operand below the value is the key. The "def" operator can also define new operators. An important result of a Postscript® defined image is that the elements in the procedure that describe an image are not evaluated until the procedure is invoked. Also, each operator has to be looked up each time the procedure is invoked. Unless a bind is used, evaluation of procedure components is delayed and the definition of an operator used in a procedure is the one in effect when the procedure is run, not when it was defined.

To define an image in Postscript®, the image is described by a path, which is a collection of connected or disjointed line segments and curves arranged on a page. The path does not actually describe actual ink on the paper, but rather describes an imaginary tracing over the page. Various operators allow a user to draw ink along the path, using the "stroke" operator, fill an enclosed path with ink, using the "fill" operator, or setting a paint region, using the "clip" operator.

A path is started with the "newpath" operator. The path is constructed out of line segments and curves. For simplicity, an exemplary square can be defined in Postscript® using the "moveto" operator, which defines a start point of the path, and the "lineto" operator, which adds line segments sequentially around the four corners of the square. Alternatively, a "closepath" operator can be used to close up the path with a smallest possible line segment, which in the case of a square object results in the same object path as using four "lineto" operators.

Once the path is defined, it can be drawn with the "stroke" operator. The "stroke" operator draws the image by following the path. The look of the stroke can be adjusted by another operator "setlinewidth". The "setlinewidth" operator sets the width of all lines to be stroked (drawn) to a value specified in points. In Postscript®, a point equals $1/72$ of an inch. The "setlinewidth" operator takes a single numerical argument, which is the width expressed in points, and affects all lines stroked after the "stroke" operator is invoked. The "setlinewidth" operator affects the markings placed on a page after it is called and does not affect the path until the path has been stroked or filled. As such, you cannot normally set the width for one part of the path and then change it to another since the path is only drawn once. The "stroke" operator is also affected by the current ink pen color, current dash pattern and other settings.

Filling a shape is achieved by creating a path as before. However, instead of calling the "stroke" operator, the "fill" operator is invoked. The "fill" operator fills the inside or outside of a closed path using current ink settings.

Typical interpreters, such as the Adobe Postscript Raster Image Processor, process data from the PDL data for subsequent printing by the printer. PDL interpreters can exist either within the printer, such as a laser printer, or can reside at an image data source, such as a personal computer or server. However, there are many instances when such conventional interpreters or other decomposing devices decompose PDL images and the resultant printed image does not portray the intended image as desired, either due to marking characteristics of the printing device or as a result of the decomposition, or due to user preference.

SUMMARY OF THE INVENTION

Image On Image (IOI) marking systems, as well as other marking systems, are known to exhibit certain undesirable line growth characteristics. For instance, thin, reverse (white) lines in a colored field may print too thin and could actually fill in completely, yielding a loss of information. In the past, efforts to control line width have been implemented in real-time digital algorithms. These include:

R. Loce, E. Dougherty "Enhancement and Restoration of Digital Documents" SPIE Press 1997;

L. Barski and R. Gaborski, "Image Character Enhancement Using a Stroke Strengthening Kernel, U.S. Pat. No. 4,791,679, Dec. 13, 1988 (ref. 13 in above book);

Crawford, J. L. and C. D. Elzinga, "Improved Output Quality by Modulating Recording Power," SPSE 41$^{st}$ Annual Conference, May 22–26, 1988, Arlington, Va. (ref. 26 in above book);

Mailloux, L., and T. Robson, "Dilation of Image Without Resolution Conversion for Printer Characteristics," U.S. Pat. No. 5,483,351, Jan. 9, 1996 (ref. 112 in above book); and a copending patent application entitled "Method and Apparatus for Digital Darkness Control Using Quantized Fractional Pixels" (File No. D/97210).

Additionally, line width has been controlled through modification of physical marking process parameters, such as Crawford, J., and J. Cunningham, "Boldness Control in an Electrophotographic Machine," U.S. Pat. No. 5,128,698, Jul. 8, 1992 (ref. 25 in above book).

However, required window size for such filtering can be prohibitively large, requiring costly scan line buffers for many product applications. There is a need for alternative methods and apparatus for controlling line widths of a PDL defined image.

Information on conventional interpreters can be found in the Postscript Language Reference Manual Second Edition, Addison-Wesley Publishing Co., 1990, the subject matter of which is incorporated herein in its entirety by reference.

Typically, an entire object is stroked in a single step so that all line widths of the object are set to the same linewidth. If the object partially overlays a colored object, the resultant linewidth, either actual or perceived, may be other than desired for some portion of the line. To overcome this, the invention provides a device that can examine determination attributes of a PDL defined graphic and redefine one or more modification attributes to redefine the representation of a line to compensate for lines that intersect with or overlay another object, which can be of the same or another color. Such a device can compensate for marking characteristics of an output printer. With such a device, segments that lie on a colored object can be adjusted separately from lines that are off of a colored object, such as those segments that are on a white background.

The invention also provides a process of examining lines and overloading operators in the PDL defined graphic such that a resultant printed or displayed image is more accurate or more representative of a desired state. This can be achieved by examining a graphic, determining from a determination attribute that one or more segments of the graphic lie on a colored object, and redefining one or more modification attributes to compensate the representation of the graphic, such as by redefining the line width of various segments separately.

BRIEF DESCRIPTION OF THE DRAWINGS

Reference will be made to the following drawings wherein like numerals refer to like elements and in which:

FIGS. 10–12 show an exemplary code written in Postscript® for achieving the process of the flow chart in FIG. 9.

DETAILED DESCRIPTION OF PREFERRED EMBODIMENTS

Figure 1:
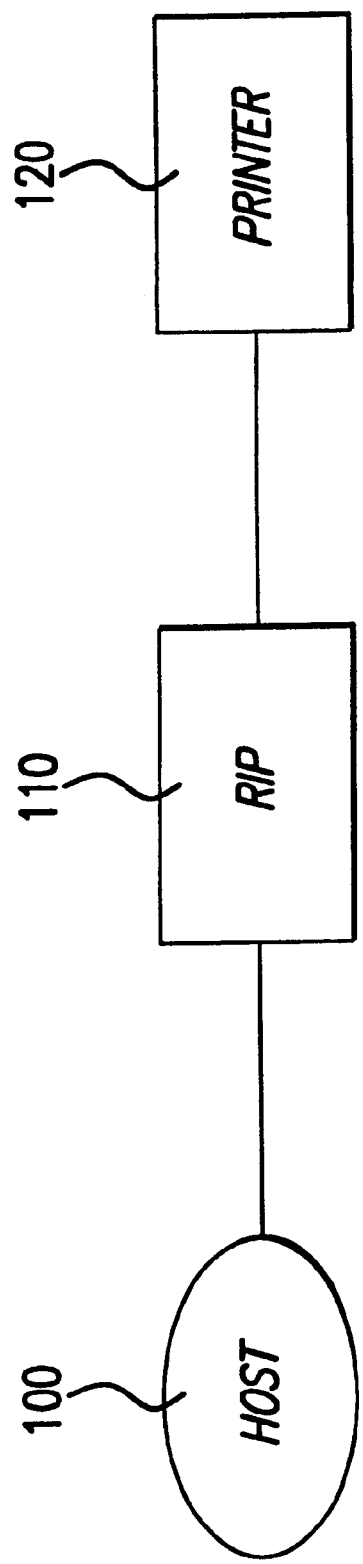
FIG. 1 is a data flow diagram illustrating a process of line width control according to the invention.

With reference to FIG. 1, in a network or single personal computer environment, a user may create a job representing a page to be printed having one or more sections of text, graphics and photos. Alternatively, a job may be scanned in or copied from an existing file. This job is encoded into a page description language, such as Postscript®, a trademark of Adobe Systems Inc., and resides at a host source 100, which may be a personal computer. The job may be sent to a printer or other marking device for printing by a printer or other marking system, or displayed on a display system, such as a monitor. However, prior to printing of the job onto a printer 120 (or displaying on an unshown display), the encoded job must be decomposed by a decomposer 110, such as a Raster Image Processor (RIP). Decomposer 110 (RIP) decomposes the job for printing on a particular printer 120.

Figure 2:
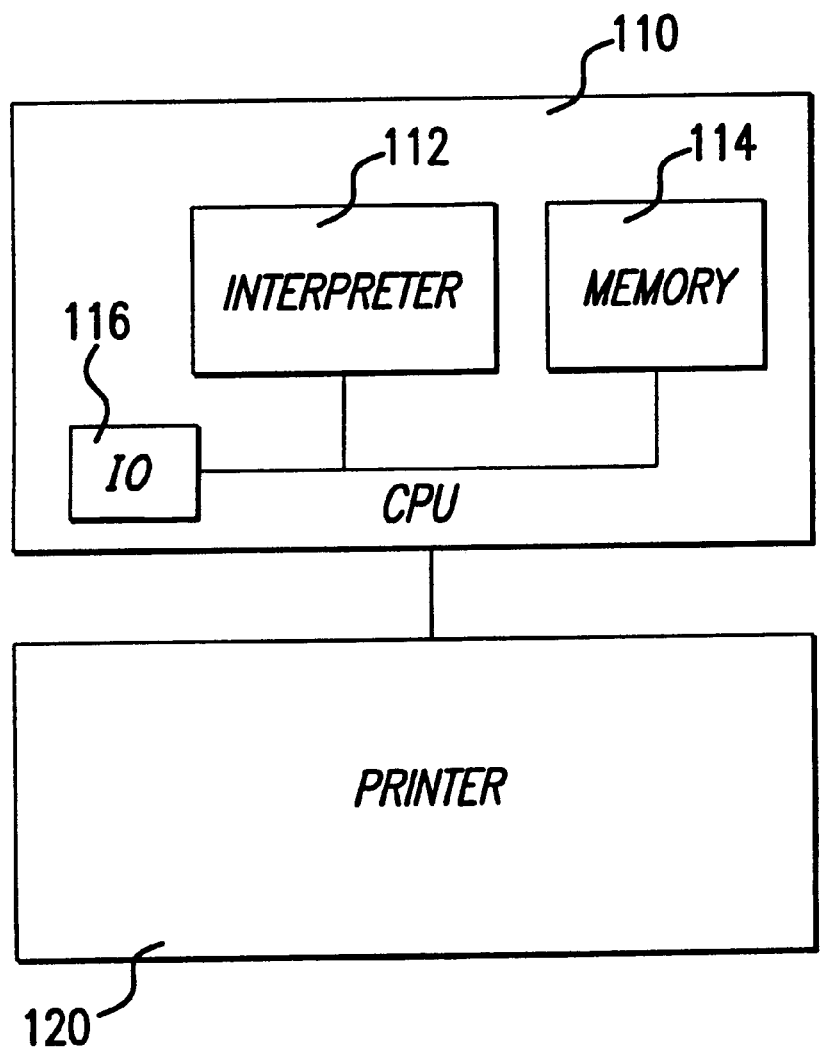
FIG. 2 is a block diagram showing a raster image processor (RIP) that processes a PDL defined image for subsequent printing by a printer according to the invention.

FIG. 2 shows an exemplary configuration to achieve line width control according to the invention. In this example, decomposer 110, which may be a general purpose computer, includes a CPU having interpreter 112 residing therein. The CPU is connected to an input/output port 116 and a memory 114. Decomposer 110 may be connected to printer 120 or host 100 through conventional cabling through the input/output port 116 of source 110, although it is most preferably located within printer 120 and internally electrically connected to a printing head of the printer through a bus line or other conventional electrical connection.

Image On Image (IOI) marking systems (color), as well as other marking systems, are known to exhibit certain undesirable line growth characteristics. For instance, thin lines in a colored field may print too thin and could actually fill in completely, yielding a loss of information. Without suitable treatment, a xerographic marking could fill in the hole and the final printed line would possess an incorrect color. To correct and compensate for such situations, line width of a PDL defined image can be controlled by "overloading" operators that control the width of lines so that they have a different and more preferred line width upon rendering a given line. In this regard, "overloading" means that the operator will be redefined to have an alternative or expanded meaning. One way this can be achieved is by overloading the "stroke" operator in Postscript® so that the stroked lines are redefined at a desired width when the lines meet certain criteria. However, if an entire line is modified to be thicker to compensate for this, portions of the line that are outside of a color filled object may appear to large.

Operator overloading for Postscript® images can be performed within a Postscript® start-up file. Overloading can also be performed in the Digital Front End (DFE) code within a DFE that renders the lines. Overloading may also be achieved by adding lines of code to the Postscript® file itself.

In some marking processes, the printed intensity of a line may be weak for certain thin widths, and thus, the lowered density can result in a smaller apparent width. To compensate for this apparently smaller width, the density of a line can be increased based upon its width or color by redefining the "stroke" operator to increase the width of any color line when it is below a specified width. Examples of alternative corrective action are increased line width, changed color, change in pattern, and stroking addition lines at the location as the current line. Again, however, depending on the background color, different corrective actions may yield the best result.

Figure 3:
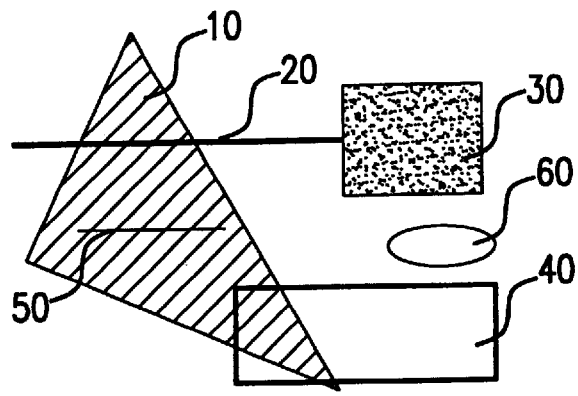
FIG. 3 is an exemplary PDL image including a plurality of partially overlapping graphics as represented in the interpreter.

With reference to FIG. 3, an exemplary PDL defined graphic image that can be created within computer 100 includes a plurality of objects, some of which partially or fully overlie each other. This image includes a light gray triangle 10, a dark gray line 20, a dark filled square 30, a black square outline 40, a thin black line 50 and a gray oval outline 60. As shown, line 20 intersects triangle 10 and square 30. Line 50 completely lies within triangle 10. Square 40 also intersects triangle 10.

Figure 4:
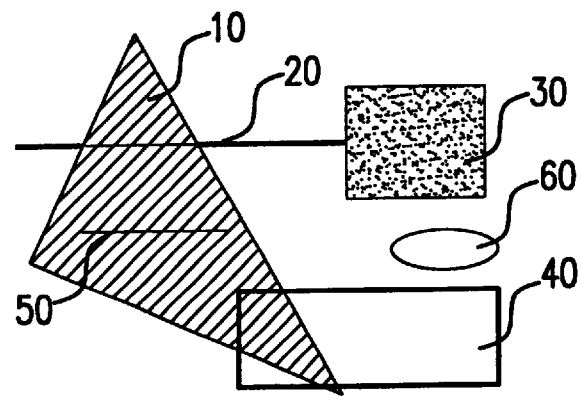
FIG. 4 is an exemplary representation of the PDL defined image of FIG. 3 as printed by an IOI marking system showing undesired marking characteristics.

FIG. 4 shows an exemplary printout of the PDL defined graphic image as it may appear after printing due to marking characteristics of a marking system (printer). As evidenced, several aspects of the graphic appear different from the intended graphic. In particular, line 20 has at least one error. The portion of the line that intersects with triangle 10 has narrowed, due to adjacency effects with the shaded area of the filling of the triangle 10. Likewise, overlapping portions of line 50 and square 40 have also partially shrunk.

Figure 5:
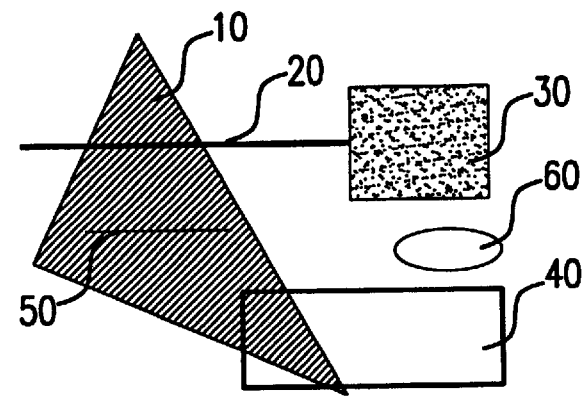
FIG. 5 is another exemplary representation of the PDL defined image of FIG. 3 as printed by an IOI marking system showing different undesired marking characteristics.

FIG. 5 shows an exemplary printout of the PDL defined graphic image as it may appear after printing due to marking characteristics of a different l0l marking system (printer), such as a full color printer. For this example we assume that the objects are different colors, but the exemplary printout is shown in monochrome for illustration purposes. As evidenced, several aspects of the graphic appear different from the intended graphic. First, a portion on the right side of the line 20 was supposed to be the same color (dark gray) as the square 30. However, due to marking process, the printed colors have bled and mixed to form a darker shade of color than intended. Likewise, a portion of line 20 overlapping triangle 10 has been changed in color due to ink bleed and mixing. Also, rectangle 40 has bled at the top left corner where it overlaps the triangle 10, also resulting in change of intended color. None of these changes were intended by the originally defined PDL graphic image.

Figure 6:
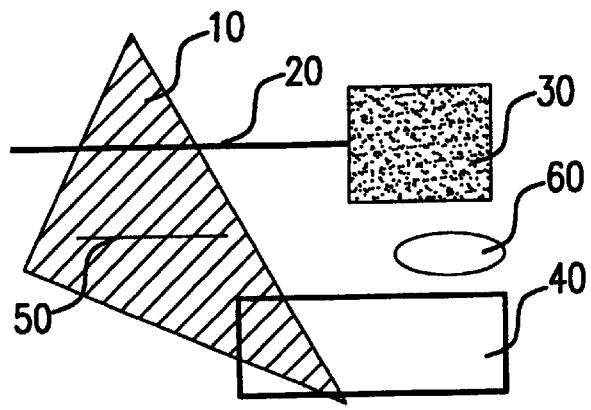
FIG. 6 is a simple redefined PDL defined image for comparison purposes.

The invention achieves correction of such problems by recognizing marking characteristics of particular marking systems and analyzing the PDL graphic before printing and redefining the graphic to compensate for such marking characteristics. FIG. 6 shows a comparative example of line redefinition that is not entirely acceptable. In this example, if overlap of the line with another object is detected, thin lines are widened to prevent fill-in of the overlapped portion of the thin line.

Unfortunately, such a redefinition will introduce further error into the printed PDL image. While overlapped portions may be properly compensated for, portions of the line that do not overlap (portions on background only) will be widened above the desired width.

The present invention overcomes such problems by determining line width, as well as whether each line intersects with another object. If it does, it is further determined whether the line entirely lies within another object or only partially overlies another object. Then, based on these determinations, various redefinitions of the line are achieved to correct the PDL defined image to compensate for particular marking systems. The present invention is most suitable for full color marking systems, but can be used for monochrome or highlight color printing as well.

Figure 7:
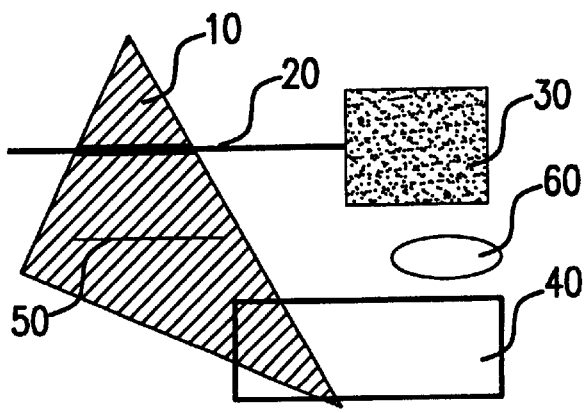
FIG. 7 is a first exemplary operator overloading to redefine the PDL image according to the invention.

FIG. 7 illustrates a redefined PDL defined image according to a first exemplary operator overloading process according to the invention. The inventive overloading process determines the existence of any line intersections with other objects, as well as determines whether the lines are entirely encompassed within another object or only partially intersect with an object. Based on these determinations, only those portions of line intersections that are overlaid are redefined. For example, as shown, the portion of line 20 overlapping triangle 10 has been widened to compensate for fill-in during marking. Although not readily apparent, the portion of line 20 overlapping square 30 is also widened.

Alternatively, line color or shade can be determined and if the overlapping portions have the same color, the widening procedure can be eliminated. All of line 50 has been widened as it is entirely within triangle 10. Oval 60 is unchanged as it does not intersect any other objects. However, like line 20, the portion of square 40 intersecting triangle 10 has been widened. Notice that remaining portions of square 40 retain the original line width.

Figure 8:
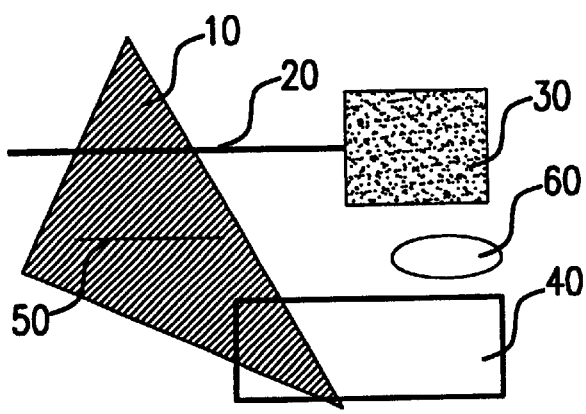
FIG. 8 is a second exemplary operator overloading to redefine the PDL image according to another embodiment of the invention.

FIG. 8 illustrates a redefined PDL defined image according to a second exemplary operator overloading process of the invention, in which color or another parameter of the line is redefined to compensate for marking error or to achieve a desired effect upon printing. This is particularly suited for a full color marking system that may have intercolor bleeding or have additive color.

If a printing system were to print the image of FIG. 3 without further manipulation of the image, the resultant printed image could appear as shown in FIG. 5. As easily noticed, an undesired coloring of the overlapping portion of the thin lines 20 and 40 within triangle 10 occurs due to a blending of the colorants when the one object is printed on top of the other object. Using cyan and magenta as examples, the resulting overlapping portion would appear as the blended color blue, whereas the desired color was actually magenta. In such multilayer systems, the final apparent color is affected by the combination of any color layers applied at the same area.

However, the PDL defined graphic image can be redefined to compensate for this. As shown, line 50 retains the same line width as originally defined. However, the shade of line 50 has been redefined to be a different color. This may be useful in a marking system with additive color because ink bleed from fill in of the object will change the color of the line 50. Depending on the color combinations, the printed image may be darker or lighter than desired. However, a proper desired printed color can be achieved by knowing the additive effect of the object color and redefining the color of line 50 to achieve a desired printed color. This also requires a knowledge of the extent of fill-in. Likewise, overlapping portions of lines 20 and 40 can be redefined. As such, redefinition of more than just line width can be used for overloading. Suitable operators for this would be: setcmykcolor, setcolor, setcolortransfer, setgray, sethsbcolor, and setrgbcolor.

Figure 9:
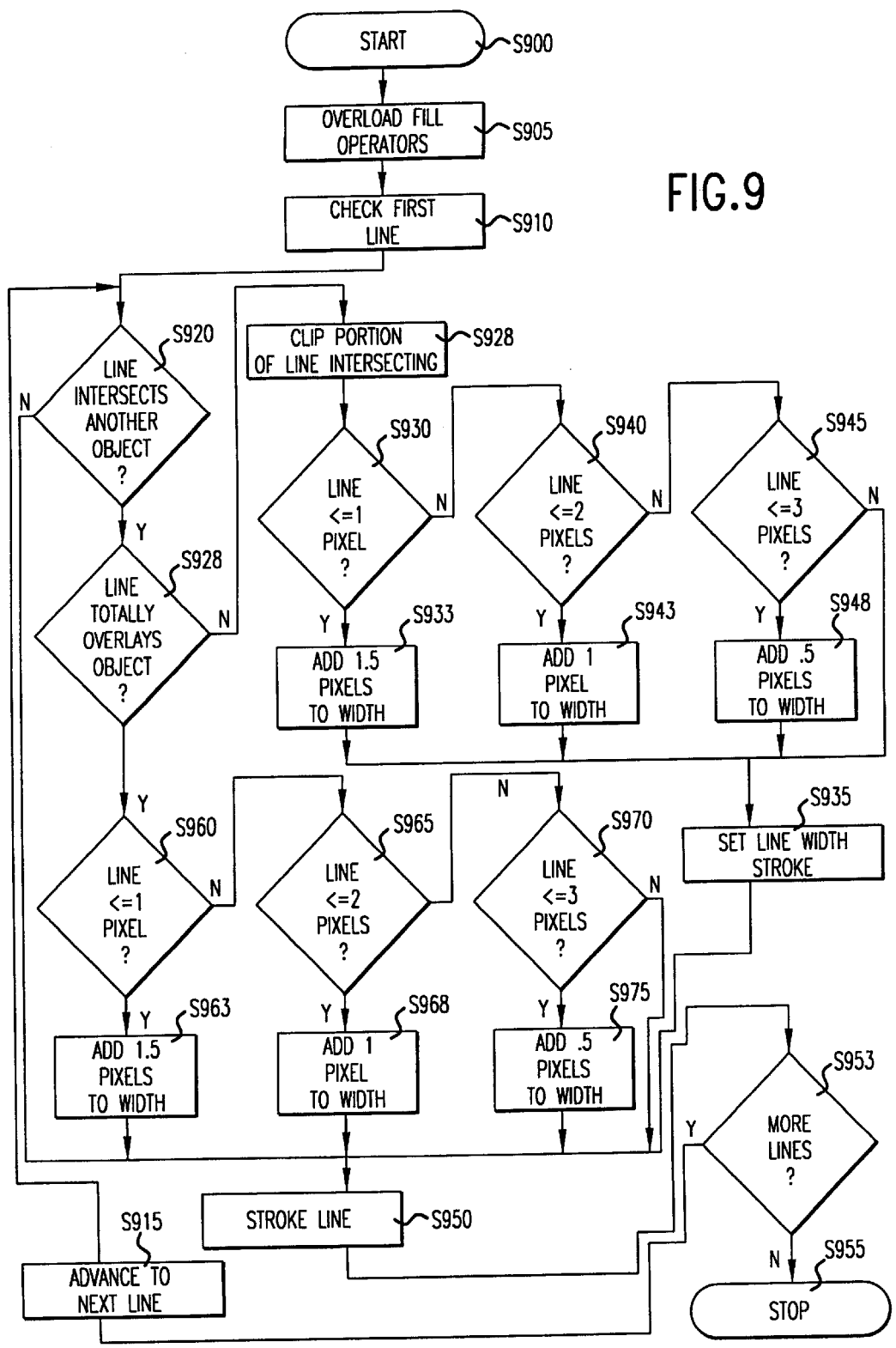
FIG. 9 is a flow chart showing a process for adjusting line widths according to the first embodiment of the invention and corresponding to the data flow diagram of FIG. 1.

FIG. 9 shows a flow chart for an exemplary process of operator overloading that can be used in the RIP 110 according to the invention, while FIGS. 10–12 show an exemplary code written in Postscript® to achieve this process. In FIGS. 10–12, single lines (1 pixel width) are designated as 0.12 based on Postscript's default resolution of 72 spots/inch.

At step S900 in FIG. 9, the process starts and the process proceeds to step S905 where all fill operators are overloaded. This can include "fill", "eofill", and "rectfill" operators in Postscript® or other comparable operators if another PDL language is used. The overloading of the fill operators in S905 is such that, when a fill operator is called, the user path for any object to be filled (the arguments of the fill operator) can be saved prior to executing the fill. As objects on a page are filled, by calling the overloaded fill operators, a dynamic memory, such as memory 114, holds the user paths for all filled objects. Then, the stroke operator is overloaded to selectively adjust lines of particular widths and to make decisions regarding intersection of lines and objects. Step S910 initiates the procedure where the process checks a first line.

The process then proceeds to step S920 where the line is checked to determine whether it intersects another object. If not, the process jumps to step S950 and the line is stroked. If the line does intersect, the process proceeds to step S925 where it is determined whether the line totally overlays the intersecting object. If the determination is no, the process determines that only a portion of the line intersects and overlies the object and proceeds to step S928. At step S928, the painting region is clipped to the user path of the underlying object Then, the process proceeds to step S930, where it is determined whether the line width is less than or equal to 1 pixel. If yes, the process proceeds to step S933 and the width of the line is increased by 1.5 pixels. If no, the process proceeds to step S940 where it is determined whether the line width is greater than 1 but less than or equal to 2 pixels. If yes, the process proceeds to step S943 and the width of the line is increased by 1 pixel. If no, the process proceeds to step S945 where it is determined whether the line width is greater than 2 but less than or equal to 3 pixels. If yes, the process proceeds to step S948 and the width of the line is increased by 0.5 pixels. If no, the process proceeds to step S935 where the stroke is executed. The process also flow from steps S933, S943 and S948 to step S935. After step S935, the process proceeds to step S950 and the line is stroked. At step S953, it is determined whether additional lines are present. If not, the process stops at step S955. If additional lines need to be checked, the process proceeds to step S915 where the next line is selected. Flow then proceeds to step S920 again.

If, however, at step S925, the line was determined to totally overlay the object, the process proceeds to step S960, where it is determined whether the line width is less than or equal to 1 pixel. If yes, the process proceeds to step S963 and the width of the line is increased by 1.5 pixels. If no, the process proceeds to step S965 where it is determined whether the line width is greater than 1 but less than or equal to 2 pixels. If yes, the process proceeds to step S968 and the width of the line is increased by 1 pixel. If no, the process proceeds to step S970 where it is determined whether the line width is greater than 2 but less than or equal to 3 pixels. If yes, the process proceeds to step S975 and the width of the line is increased by 0.5 pixels. Flow from any of steps S963, S968, S975 and the no branch of step S970 proceeds to step S950 where the line is stroked. Again, at step S953, it is determined whether additional lines need to be checked.

While the preferred embodiment described above uses variable adjustment of widths, one could also use a single incremental value, such as addition of 1 pixel to the width of all lines that are below a given threshold, such as three pixels wide. Various other modifications can be made, including reducing the width of overly wide lines.

Moreover, as discussed briefly with reference to FIG. 8, attributes of the PDL defined image other than line width can be redefined to remedy printing error or perception of the printed image. These attributes can include color correction or addition of lines of another color under the line. The latter may be beneficial to prevent "cookie-cutter" fill in, by redefining the line to include a wider white line under a non-white line.

Most any desired criteria can be used to determine which lines should be modified. The essential part of the invention is in the identification of lines that are: 1) not overlapping any other object; 2) partially overlapping one or more objects; and 3) fully overlapping an object. Thus, with the invention, each time a line is found possessing a width in the range to be adjusted, the user path array is searched for an object that either intersects the path of the line to be stroked or fully encompasses the line. If such an intersection occurs, the width of the line is adjusted and stroked within the area clipped by the background object. The path may then be stroked a second time with the original line width or other choice line width to write the portion of the line that lies beyond the clipping path. This method allows only lines overlaying a background color to change width. If the line is found to be completely within a filled object, the line width is adjusted and the line is stroked. If no intersection occurs, no adjustment is made to the line and it is stroked with the intended line width. By only redefining portions of the lines that are overlapping, correction can be achieved without introduction of new error on non-overlapping portions, which are being printed on a background (white).

The Raster Image Processor (RIP) 110 is preferably implemented on a general purpose computer. However, the interpreter can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PDL, PLA, FPGA or PAL, or the like. As discussed previously, the RIP 110 can be implemented as part of printer 120.

Although the invention has been described in detail above with respect to several preferred embodiments, various modifications can be implemented without departing from the spirit and scope of the invention. For example, while primarily described with respect to a printing system, the processes are readily implemented for display of a job on a display system.

What is claimed is:

1. A method for manipulating representation of a page description language defined graphic, the graphic including a line of an object, the method comprising the steps of:
    examining the line;
    determining whether the line intersects with another object and if so, further determining whether the line completely overlays the another object; and
    modifying a modification attribute of the graphic if the line is determined to either intersect with or completely overlay the another object to redefine the modification attribute so that the graphic is manipulated, wherein the modification attribute is line width.

2. The method of claim 1, wherein the modification attribute is line width and the step of modifying increases the width of the line if current line width is below a predetermined value.

3. The method of claim 1, further comprising a step of comparing a current line width attribute against at least first and second increasing values, wherein the step of modifying sets a modification attribute to widen the line width of the line by a first amount when current line width of the line is less than or equal to the first increasing value, sets a modification attribute to widen the line width of the line by a second amount when the current line width is greater than the first increasing value and less than or equal to the second increasing value, and sets a modification attribute to widen the line width of the line by a third amount when the current line width is greater than the second increasing value.

4. The method of claim 1, further comprising the steps of:
    determining marking characteristics of a desired output printer;
    the step of modifying redefines the modification attribute so that line width of the line is manipulated to compensate for the determined marking characteristics of the output printer; and
    outputting the graphic with the redefined modification attribute to the output printer.

5. The method of claim 4, wherein the marking characteristics include spread of colorants through ink bleed.

6. The method of claim 4, wherein the marking characteristics include low density print at thin line widths.

7. A method for manipulating representation of a page description language defined graphic, the graphic including a line of an object, the method comprising the steps of:
examining the line;
determining whether the line intersects with another object and if so, further determining whether the line completely overlays the another object; and
modifying a modification attribute of the graphic if the line is determined to either intersect with or completely overlay the another object to redefine the modification attribute so that the graphic is manipulated,
wherein if the determining steps determine that the line intersects another object but does not completely overlay the another object, an overlying portion of the line that overlays the another object is determined and the step of modifying redefines a modification attribute that only affects redefinition of the overlying portion of the line.

8. The method of claim 7, wherein the modification attribute is line width and only the overlying portion of the line is widened by the step of modifying.

9. The method of claim 7, wherein the step of modifying adds a wider white line underneath only the overlying portion of the line.

10. A method for manipulating representation of a page description language defined graphic, the graphic including a line of an object, the method comprising the steps of:
examining the line;
determining whether the line intersects with another object and if so, further determining whether the line completely overlays the another object; and
modifying a modification attribute of the graphic if the line is determined to either intersect with or completely overlay the another object to redefine the modification attribute so that the graphic is manipulated, wherein the step of modifying includes overloading a stroke operator in the page description language to redefine the operator.

11. A method for manipulating representation of a page description language defined graphic, the graphic including a line of an object, the method comprising the steps of:
examining the line;
determining whether the line intersects with another object and if so, further determining whether the line completely overlays the another object; and
modifying a modification attribute of the graphic if the line is determined to either intersect with or completely overlay the another object to redefine the modification attribute so that the graphic is manipulated, wherein the modification attribute is line color.

12. A decomposer that manipulates a page description language defined graphic, the graphic including a line, the decomposer comprising:
means within the decomposer for examining a line of the graphic;
means within the decomposer for determining whether the line intersects with another object;
means within the decomposer for further determining whether the line completely overlays the another object;
means within the decomposer for determining whether compensation of the graphic is required to reproduce the graphic as desired by examining a determination attribute if the line is determined to either intersect with or completely overlay the another object to redefine the graphic; and
means within the decomposer for modifying the graphic by redefining a modification attribute so that the graphic is manipulated when compensation of the graphic is determined to be required, wherein the modification attribute is line width.

13. The decomposer of claim 12, wherein the determination attribute is line width.

14. The decomposer of claim 12, wherein the means for modifying increases the width of the line if current line width is below a predetermined value.

15. The decomposer of claim 12, wherein the means for determining that compensation of the graphic is necessary compares a current line width attribute against at least first and second increasing values, and the means for modifying sets a modification attribute to widen the line width of the line by a first value when current line width is less than or equal to the first increasing value, sets a modification attribute to widen the line width of the line by a second value when current line width is greater than the first increasing value and less than or equal to the second increasing value, and sets a modification attribute to widen the line width of the line by a third value when current line width is greater than the second increasing value.

16. The decomposer of claim 12, further comprising:
means for determining marking characteristics of a desired output printer;
the means for modifying redefines the modification attributes so that line width is manipulated to compensate for the determined marking characteristics of the output printer; and
means for outputting the graphic with the redefined modification attribute to the output printer.

17. A printer including the decomposer of claim 12.

18. A processor including the decomposer of claim 12.

19. A decomposer that manipulates a page description language defined graphic, the graphic including a line, the decomposer comprising:
means within the decomposer for examining a line of the graphic;
means within the decomposer for determining whether the line intersects with another object;
means within the decomposer for further determining whether the line completely overlays the another object;
means within the decomposer for determining whether compensation of the graphic is required to reproduce the graphic as desired by examining a determination attribute if the line is determined to either intersect with or completely overlay the another object to redefine the graphic; and
means within the decomposer for modifying the graphic by redefining a modification attribute so that the graphic is manipulated when compensation of the graphic is determined to be required,
wherein if the means for determining determine that the line intersects another object but does not completely overlay the another object, an overlying portion of the line that overlays the another object is determined and the means for modifying redefines a modification attribute of the graphic that only affects redefinition of the overlying portion of the line.

20. The decomposer of claim 19, wherein the modification attribute is line width and only the overlying portion of the line is widened by the means for modifying.

* * * * *